US009720756B2

(12) United States Patent
Frolikov et al.

(10) Patent No.: US 9,720,756 B2
(45) Date of Patent: Aug. 1, 2017

(54) COMPUTING SYSTEM WITH DEBUG ASSERT MECHANISM AND METHOD OF OPERATION THEREOF

(71) Applicant: Samsung Electronics Co., Ltd., Suwon-si, Gyeonggi-Do (KR)

(72) Inventors: Alexei Frolikov, San Jose, CA (US); Hwan Kim, Hwaseong-si (KR); Yangsup Lee, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 94 days.

(21) Appl. No.: 14/921,517

(22) Filed: Oct. 23, 2015

(65) Prior Publication Data
US 2016/0132382 A1 May 12, 2016

Related U.S. Application Data

(60) Provisional application No. 62/078,889, filed on Nov. 12, 2014.

(51) Int. Cl.
*G06F 11/00* (2006.01)
*G06F 11/07* (2006.01)

(52) U.S. Cl.
CPC ...... *G06F 11/0778* (2013.01); *G06F 11/0721* (2013.01); *G06F 11/0724* (2013.01); *G06F 11/0751* (2013.01); *G06F 11/0775* (2013.01); *G06F 11/0787* (2013.01)

(58) Field of Classification Search
CPC ............. G06F 11/0721; G06F 11/0724; G06F 11/0751; G06F 11/0775; G06F 11/0778; G06F 11/0787
See application file for complete search history.

(56) References Cited

U.S. PATENT DOCUMENTS

| | | | |
|---|---|---|---|
| 7,665,002 B1 | 2/2010 | White et al. | |
| 8,380,966 B2 | 2/2013 | Codrescu et al. | |
| 8,522,079 B2 | 8/2013 | Liao et al. | |
| 2010/0174892 A1* | 7/2010 | Steeb | G06F 11/3632 712/227 |
| 2012/0110353 A1* | 5/2012 | Ehrlich | G06F 1/3203 713/300 |
| 2012/0150474 A1* | 6/2012 | Rentschler | G01R 31/31705 702/117 |
| 2014/0289711 A1 | 9/2014 | Usui | |
| 2014/0344919 A1* | 11/2014 | Wu | G06F 21/74 726/17 |

\* cited by examiner

*Primary Examiner* — Joshua P Lottich
(74) *Attorney, Agent, or Firm* — IP Investment Law Group

(57) ABSTRACT

A computing system includes: a volatile memory configured to: store a debug assert flag mask including bits; cores, coupled to the volatile memory, configured to: detect an error in at least one of the cores, set at least one of the bits corresponding to the cores with the error detected, collect debug information for each of the cores with the error detected, collect operating information for each of the cores without the error detected, generate assert dump information based on compiling the debug information; and a nonvolatile memory, coupled to at least one of the cores, configured to: store the assert dump information, the operating information, configured to by at least one of the cores.

22 Claims, 4 Drawing Sheets

COMPUTING SYSTEM WITH DEBUG ASSERT MECHANISM AND METHOD OF OPERATION THEREOF

CROSS-REFERENCE TO RELATED APPLICATION(S)

This application claims the benefit of U.S. Provisional Patent Application Ser. No. 62/078,889 filed Nov. 12, 2014, and the subject matter thereof is incorporated herein by reference thereto.

TECHNICAL FIELD

Embodiments relate generally to a computing system, and more particularly to a system with debug assert mechanism.

BACKGROUND

Modern consumer and industrial electronics, such as computing systems, servers, appliances, televisions, cellular phones, automobiles, satellites, and combination devices, are providing increasing levels of functionality to support modern life. These devices are more interconnected. Storage of information is becoming more of a necessity.

Research and development in the existing technologies can take a myriad of different directions. Collecting debugging information for further analysis is becoming more important. Processing efficiency and communication between computing resources are more problematic as the amount of debug information collection, data, computation, and storage increases.

Thus, a need still remains for a computing system with debug assert mechanism to collect debug information for further analysis. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

SUMMARY

An embodiment provides an apparatus, including: a volatile memory configured to: store a debug assert flag mask including bits; cores, coupled to the volatile memory, configured to: detect an error in at least one of the cores, set at least one of the bits corresponding to the cores with the error detected, collect debug information for each of the cores with the error detected, collect operating information for each of the cores without the error detected, generate assert dump information based on compiling the debug information; and a nonvolatile memory, coupled to at least one of the cores, configured to: store the assert dump information, the operating information, or a combination thereof by at least one of the cores.

An embodiment provides a method including: storing a debug assert flag mask including bits; detecting an error in at least one of the cores; setting at least one of the bits corresponding to the cores with the error detected; collecting debug information for each of the cores with the error detected; collecting operating information for each of the cores without the error detected; generating assert dump information based on compiling the debug information; and storing the assert dump information, the operating information, or a combination thereof by at least one of the cores.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
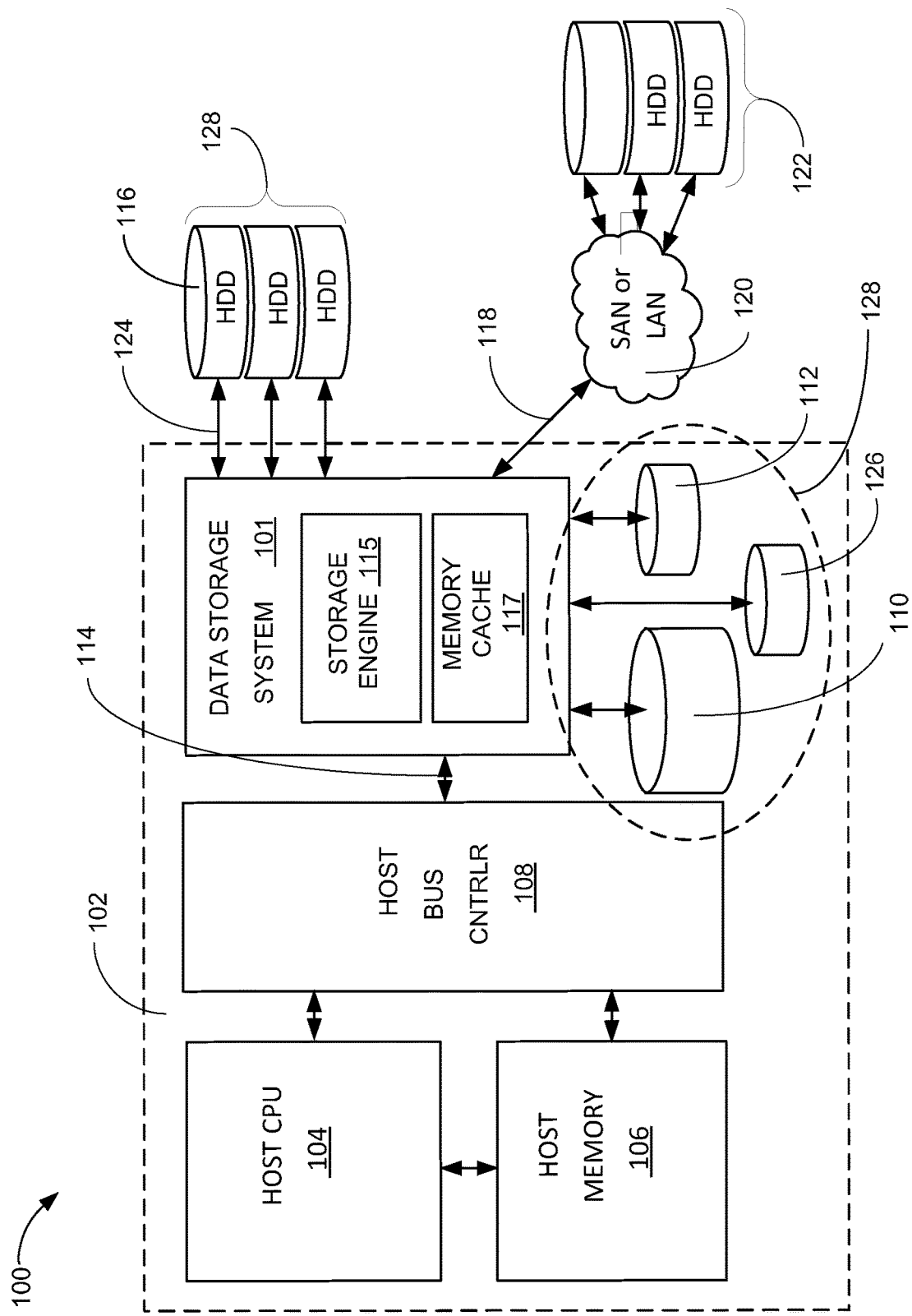
FIG. 1 is a computing system with debug assert mechanism in an embodiment of the present invention.

Various embodiments improve the robustness of the computing system storing debug information when an error occurs at the one of multiple instances of a core. By setting a debug assert flag mask for a corresponding instance of a bit for each instances of the core based on the debug information, the computing system can track which instance out of many instances of the core detected the error. As a result, the core can generate assert dump information based on compiling the debug information from each instance of the core for storing in a non-volatile memory for further analysis of the error.

The following embodiments are described in sufficient detail to enable those skilled in the art to make and use the invention. It is to be understood that other embodiments may be evident based on the present disclosure, and that system, process, architectural, or mechanical changes can be made to the embodiments as examples without departing from the scope of the present invention.

In the following description, numerous specific details are given to provide a thorough understanding of the invention. However, it will be apparent that the invention and various embodiments may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, an embodiment can be operated in any orientation.

The term "module" referred to herein can include software, hardware, or a combination thereof in some embodiments of the present invention in accordance with the context in which the term is used. For example, the software can be machine code, firmware, embedded code, application software, or a combination thereof. Also for example, the hardware can be circuitry, processors, computers, integrated circuits, integrated circuit cores, a pressure sensor, an inertial sensor, a microelectromechanical system (MEMS), passive devices, or a combination thereof. Additional examples of hardware circuitry can be digital circuits or logic, analog circuits, mixed-mode circuits, optical circuits, or a combination thereof. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening between coupled items. The coupling can be physical contact or by communication between items.

Referring now to FIG. 1, therein is shown a computing system 100 with debug assert mechanism in an embodiment of the present invention. The computing system 100 is depicted in FIG. 1 as a functional block diagram of the computing system 100 with a data storage system 101. The functional block diagram depicts the data storage system 101 installed in a host computer 102.

As an example, the host computer 102 can be as a server or workstation. The host computer 102 can include at least a central processing unit 104, host memory 106 coupled to the central processing unit 104, and a host bus controller 108. The host bus controller 108 provides a host interface bus 114, which allows the host computer 102 to utilize the data storage system 101.

It is understood that the function of the host bus controller 108 can be provided by the central processing unit 104 in some implementations. The central processing unit 104 can be implemented with hardware circuitry in a number of different manners. For example, the central processing unit 104 can be a processor, an application specific integrated circuit (ASIC) an embedded processor, a microprocessor, a hardware control logic, a hardware finite state machine (FSM), a digital signal processor (DSP), a field-programmable gate array (FPGA), or a combination thereof. For further example, the central processing unit 104 can represent a multi-core processor. The data storage system 101 can be coupled to a volatile memory 126, such as such as a dynamic random access memory (DRAM) or a static random access memory (SRAM).

The data storage system 101 can be coupled to a solid state disk 110, such as a non-volatile memory based storage device having a peripheral interface system, or a non-volatile memory 112, such as an internal memory card for expanded or extended non-volatile system memory.

The data storage system 101 can also be coupled to hard disk drives (HDD) 116 that can be mounted in the host computer 102, external to the host computer 102, or a combination thereof.

The data storage system 101 can also support a network attach port 118 for coupling a network 120. Examples of the network 120 can be a local area network (LAN) and a storage area network (SAN). The network attach port 118 can also provide connection to and from the host bus controller 108.

While the network attached storage devices 122 are shown as hard disk drives, this is an example only. It is understood that the network attached storage devices 122 could include magnetic tape storage (not shown), and storage devices similar to the solid state disk 110, the non-volatile memory 112, or the HDD 116 that are accessed through the network attach port 118. Also, the network attached storage devices 122 can include just a bunch of disks (JBOD) systems, just a bunch of flash (JBOF), or redundant array of intelligent disks (RAID) systems as well as other network attached storage devices 122.

The data storage system 101 can include a storage engine 115 and memory devices 117. The storage engine 115 can be implemented with hardware circuitry, software, or a combination thereof in a number of ways. For example, the storage engine 115 can be implemented as a processor, an application specific integrated circuit (ASIC) an embedded processor, a microprocessor, a hardware control logic, a hardware finite state machine (FSM), a digital signal processor (DSP), an FPGA, or a combination thereof. For further example, the storage engine 115 can represent a multi-core processor or a portion of the multi-core processing architecture.

The central processing unit 104 or the storage engine 115 can control the flow and management of data to and from the host computer 102, and from and to the direct attached storage (DAS) devices, the network attached storage devices 122, or a combination thereof. The storage engine 115 can also perform data reliability check and correction. The storage engine 115 can also control and manage the flow of data between the direct attached storage (DAS) devices and the network attached storage devices 122 and amongst themselves. The storage engine 115 can be implemented in hardware circuitry, a processor running software, or a combination thereof.

For illustrative purposes, the storage engine 115 is shown as part of the data storage system 101, although the storage engine 115 can be implemented and partitioned differently. For example, the storage engine 115 can be implemented as part of in the host computer 102, implemented in software, implemented in hardware, or a combination thereof. The storage engine 115 can be external to the data storage system 101. As examples, the storage engine 115 can be part of the direct attached storage (DAS) devices described above, the network attached storage devices 122, or a combination thereof. The functionalities of the storage engine 115 can be distributed as part of the host computer 102, the direct attached storage (DAS) devices, the network attached storage devices 122, or a combination thereof. The central processing unit 104 or some form of it can also be in or control the data storage system 101, the direct attached storage (DAS) devices, the network attached storage devices 122, or a combination thereof.

The memory devices 117 can function as a local cache to the data storage system 101, the computing system 100, or a combination thereof. The memory devices 117 can be a volatile memory or a nonvolatile memory. Examples of the volatile memory can be static random access memory (SRAM) or dynamic random access memory (DRAM).

The storage engine 115 and the memory devices 117 enable the data storage system 101 to meet the performance requirements of data provided by the host computer 102 and store that data in the solid state disk 110, the non-volatile memory 112, the HDD 116, or the network attached storage devices 122.

A non-volatile region 128 can include the non-volatile memory 112, the HDD 116, the memory devices 117, or a combination thereof. The non-volatile region 128 can represent a cluster of devices representing a non-volatile memory for the computing system 100. The cluster can include one device or multiple devices.

For illustrative purposes, the data storage system 101 is shown as part of the host computer 102, although the data storage system 101 can be implemented and partitioned differently. For example, the data storage system 101 can be implemented as a plug-in card in the host computer 102, as part of a chip or chipset in the host computer 102, as partially implement in software and partially implemented in hardware in the host computer 102, or a combination thereof. The data storage system 101 can be external to the host computer 102. As examples, the data storage system 101 can be part of the direct attached storage (DAS) devices described above, the network attached storage devices 122, or a combination thereof. The data storage system 101 can be distributed as part of the host computer 102, the direct attached storage (DAS) devices, the network attached storage devices 122, or a combination thereof.

Figure 2:
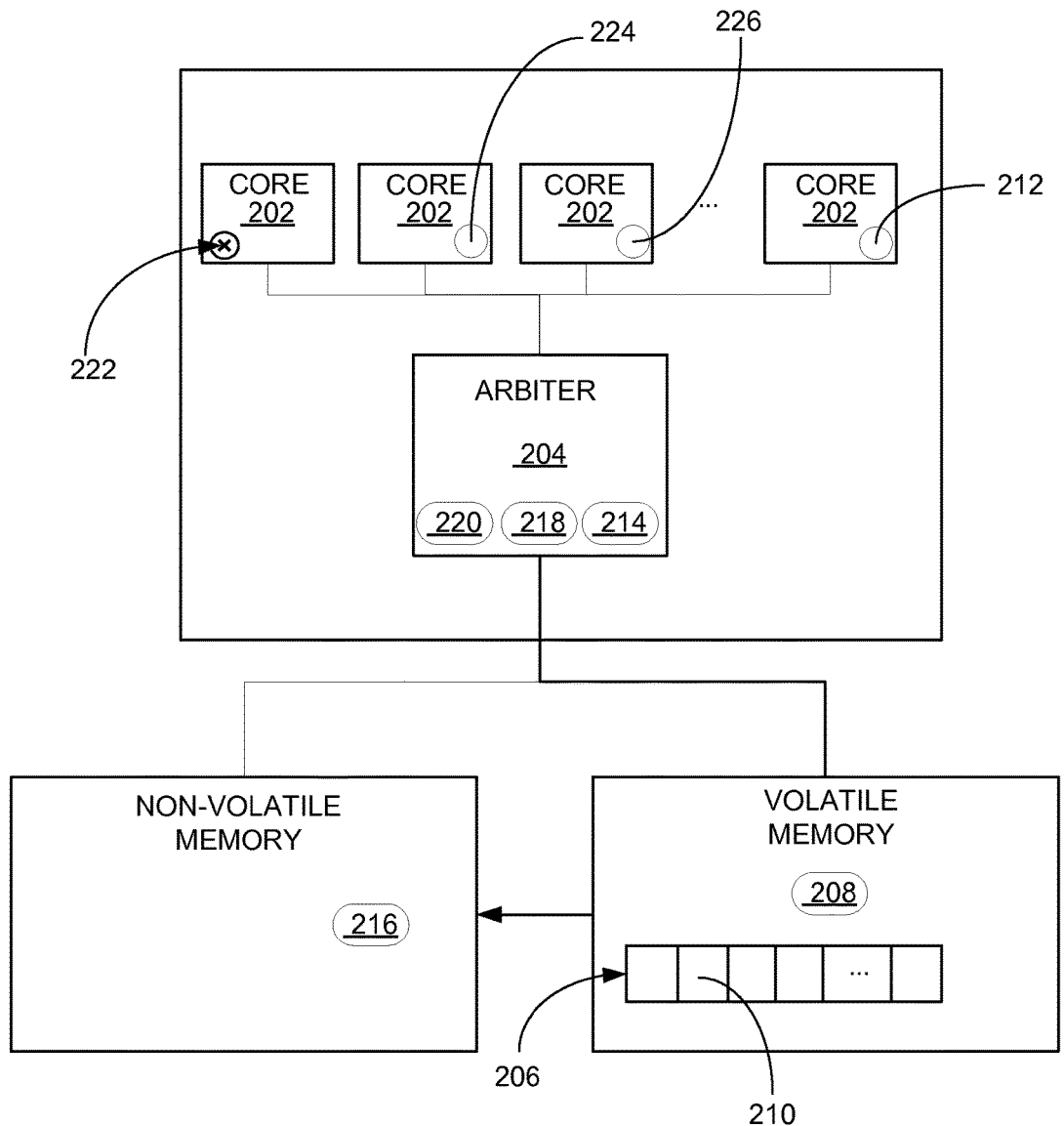
FIG. 2 is an example of an architecture view of a computing system with a debug assert mechanism.

Referring now to FIG. 2, therein is shown an architecture view of a computing system 100 with a debug assert mechanism. The architecture view can depict an example of relationships between some parts in the computing system 100. As an example, the architecture view can depict the computing system 100 to include a core 202, an arbiter 204, a debug assert flag mask 206, or a combination thereof.

The core 202 is hardware circuitry with the capability to perform processing operations. Various embodiments can include the core 202 as an embedded within an integrated circuit or be an integrated circuit. As examples, the core 202 can represent a processor, an application specific integrated circuit (ASIC) an embedded processor, a microprocessor, a hardware control logic, a hardware finite state machine (FSM), a digital signal processor (DSP), FPGA, or a combination thereof.

For example, various embodiments can include the central processing unit 104 of FIG. 1, the storage engine 115 of FIG. 1, or a combination thereof as parts of or multiple instances of the core 202 as a multi-core processor. For further example, the core 202 can exist wherever the computing resource exists in the computing system 100. More specifically as an example, each instances of the core 202 can exist in discrete devices.

For another example, the solid state disk 110 of FIG. 1 can include a controller represented by the storage engine 115. As an example, the storage engine 115 can include as many as 16 instances of the core 202 sharing a common instance of the volatile memory 126 of FIG. 1. For example, the volatile memory 126 can include a single data rate (SDR) DRAM, a double data rate (DDR) DRAM, a quad data rate (QDR) DRAM, or a combination thereof Each instances of the core 202 can communicate with each other via interprocess communication (IPC) messages. The IPC messages can represent an activity of data sharing across multiple processes via a communication protocol. For example, the multiple instances of the core 202 can communicate with each other via the IPC message when an assert occurs. The assert is an error condition detected by the core 202. Examples of the error condition include hardware errors, firmware errors, or a combination thereof. Examples of hardware errors include invalidate inputs or internal states in the core 202. Examples of firmware errors invalidate inputs to the firmware or invalidate states within the firmware. As an example, if an assert occurs, the core 202 can communicate to another instance of the core 202 with the IPC message that an error 222 had occurred.

The error 222 can include a critical firmware or hardware error. When the critical firmware or hardware error occurs, the computing system 100 can collect debug information 208 from the core 202. The firmware error can representing logical error including NULL a pointer encountered, a number of dead units of the non-volatile memory 112 of FIG. 1, such as dead NAND flash chips detected on the solid state disk 110, or a combination thereof. For further example, the logical error can include a stack overflow, a memory overflow, or a combination thereof. For another example, the logical error can include a memory alignment error.

For a different example, the firmware error can include the NAND flash memory reading to one instance of a logical block addressing (LBA) returning data written for another instance of the LBA. By reading the meta data from the NAND flash memory, the firmware can tell that the data is read from the wrong place.

The hardware error can include direct memory access (DMA) transfer error. For further example, the hardware error can include NAND channel getting stuck and requiring reset. For another example, the hardware error can include buffer manager representing a hardware component returning NULL buffer.

The debug information 208 is information regarding the core 202 improperly functioning. Non-limiting examples of the debug information 208 for the core 202 can include information for the program count (not shown), instruction pipeline (not shown and if available), status information, arithmetic logic unit (ALU), inputs to the core 202, or a combination thereof. The computing system 100 can store the debug information 208 into the non-volatile region 128 of FIG. 1, such as, the non-volatile memory 112, the HDD 116 of FIG. 1, the memory devices 117 of FIG. 1, or a combination thereof. The debug information 208 can also be stored in the volatile region 126.

As discussed above, each instances of the core 202 can have access to the volatile memory 126, which can be a shared resource for the plurality of the core 202, in which the debug assert flag mask 206 is stored. The volatile memory 126 can represent DDR DRAM. The debug assert flag mask 206 is an indicator indicating that the error 222 had occurred in the core 202. The error 222 can be triggered by software, hardware fault, hardware failure, firmware exception, or a combination thereof.

For example, the debug assert flag mask 206 can include multiple instances of a bit 210 with each instances of the bit 210 corresponding to each instances of the core 202. The bit 210 is a unit of information to signify a value. For example, the bit 210 can be represented in digital logic "0" or "1", an analog signal, or combination thereof. For a specific example, one instance of the bit 210 can be assigned to one instance of the core 202. The bit 210 can be initialized as "0" by default to indicate a non-error condition detected. For further example, the debug assert flag mask 206 can include the bit 210 representing a non-zero value to indicate the error 222. More specifically as an example, the same instance of the bit 210 can initially be "0" but set to the non-zero value if the error 222 occurs. The debug assert flag mask 206 can be stored in the volatile memory 126.

If the error 222 is encountered in any instance of the core 202, the core 202 can set the corresponding instance of the bit 210 in the debug assert flag mask 206. The core 202 can write the relevant instance of the debug information 208 into the predesignated region of the volatile memory 126 including the DDR DRAM assigned for the particular instance of the core 202.

Each instances of the core 202 can include a timer 212. The timer 212 can exist independently from the core 202 and can be shared by multiple instances of the core 202. The timer 212 tracks the time of the core 202 based on a predefined interval 214. The time can be represented in any metric of time, such as nanosecond, microsecond, millisecond, second, or a combination thereof. More specifically as an example, the core 202 can poll the debug assert flag mask 206 at the predefined interval 214, which is a set time between polling by the core 202. The predefined interval 214 can be represented in any metric of time, such as nanosecond, microsecond, millisecond, second, or a combination thereof For example, the predefined interval 214 can represent less than a second, a second, greater than a second, or a combination thereof. If the core 202 determines that the debug assert flag mask 206 includes the bit 210 with a non-zero value, then an "assert" or the error 222 has occurred on one or more instances of the core 202. Each instances of the core 202 then can proceed to store their own instance of the debug information 208 even if the error 222 did not occur in their specific instances of the core 202. More specifically as an example, the core 202 without the error 222 can collect and store operating information 228. The operating information 228 is information on how the core 202 controls, communicates, or a combination thereof. The core 202 can store the operating information 228 in the volatile memory 126, the non-volatile region 128, or a combination thereof. For further example, the core 202 can set the corresponding instance of the bit 210 in the debug assert flag mask 206 to non-zero value until all instances of the core 202 have updated the debug assert flag mask 206.

Once the debug assert flag mask 206 for all instances of the core 202 are set (e.g., full), meaning all instances of the core 202 are done storing the debug information 208 and the debug assert flag mask 206, for example, is set to "0xFFFF," an interface core 224 can store additional hardware register(s) to the volatile memory 126.

The interface core 224 is the core 202 responsible for storing assert dump information 216. The assert dump information 216 is a compilation of the debug information 208. For example, the assert dump information 216 can represent a compilation of the debug information 208 from all instances of the core 202 or from instances of the core 202 that had the error 222. The assert dump information 216 can be stored in the non-volatile region 128, the volatile region 126, or a combination thereof.

A backup core 226 is the core 202 responsible for storing the assert dump information 216 if the interface core 224 is unavailable to store the assert dump information 216. For example, the backup core 226 can represent one of out the multiple instances of the core 202 other than the interface core 224.

For example, the interface core 224 can store the assert dump information 216 based on compiling the debug information 208 from each instances of the core 202 to the non-volatile region 128 including the solid state disk 110, the non-volatile memory 112, the HDD 116, the memory devices 117, or a combination thereof. Once gathering of the debug information 208 is complete in the volatile memory 126, such as DDR DRAM, the computing system 100 can generate the assert dump information 216 to store in the non-volatile region 128.

There can be severe error conditions when one or more instances of the core 202 are unable to write the debug information 208 to the volatile memory 126, such as DDR DRAM. Thus, the debug assert flag mask 206 is unable to become full. As a result, if one of the instances of the bit 210 in the debug assert flag mask 206 is non-zero value for more than a non-zero time limit 218, the debug information 208 can be stored in the non-volatile region 128. The non-zero time limit 218 is a limit of time where the debug assert flag mask 206 can contain a same instance of a non-zero value. For example, the non-zero time limit 218 can represent consecutive instances of the predefined interval 214. For another example, the non-zero time limit 218 can represent a predefined time period.

More specifically as an example, the non-zero time limit 218 can represent two intervals. If the value of the debug assert flag mask 206 remains as, for example, "0xFFF7" (not full) for two intervals, the core 202 can generate the assert dump information 216 by compiling the debug information 208 for storing in the non-volatile region 128 even if the debug assert flag mask 206 is not set to "0xFFFF" (full).

The arbiter 204 provides access control to the volatile memory 126, the volatile region 128, or a combination thereof shared by instances of the core 202. For example, the arbiter 204 can grant access to the interface core 224 for storing the assert dump information 216 to the non-volatile region 128. For a different example, the arbiter 204 can grant access to the core 202 asserting the first instance of the error 222 to store the assert dump information 216 to the non-volatile region 128. For further example, the arbiter 204 can grant access to the core 202 that did not assert the error 222 to store the assert dump information 216 to the non-volatile region 128.

The computing system 100 can track the first instance of the core 202 asserting the error 222 as other instances of the core 202 can also assert the error 222 as a result of the first instance of the core 202 asserting. More specifically as an example, the first instance of the error 222 can be most relevant for failure analysis because the first instance of the core 202 asserting the error 222 can store the debug information 208 or the assert dump information 216 including an error message, the line number of where the error 222 occurred, the identification of the core 202, or a combination thereof.

For further example, other instances of the core 202 can be configured not to store the debug information 208 or the assert dump information 216 if the core 202 is not the first instance of the core 202 to assert the error 222. For another example, the core 202 already performing the flash interface function can store the assert dump information 216 to the non-volatile region 128.

For another example, if the core 202 fails to store the assert dump information 216, the computing system 100 can retry to store the assert dump information 216. More specifically as an example, a retry threshold 220 is a limit on number of retries. For example, the computing system 100 can retry to store the assert dump information 216 up to the retry threshold 220.

The computing system 100 can check the area of the non-volatile region 128 including the non-volatile memory 112, the HDD 116, the memory devices 117, or a combination thereof to see whether the assert dump information 216 is stored. If the non-volatile region 128 is not blank, the assert dump information 216 was stored previously. As a result, for example, at every power-on, the computing system 100 can read the assert dump information 216 to put the assert dump information 216 back into the volatile memory 126 representing DDR DRAM. For further example, the assert dump information 216 present at the power-on can represent a "read only" state to prohibit any writes to the devices.

For a different example, an error recovery performed by the interface core 224 or the backup core 226 may be both unavailable. The computing system 100 can retrieve a nonvolatile code from the volatile memory 126, as an example.

Figure 3:
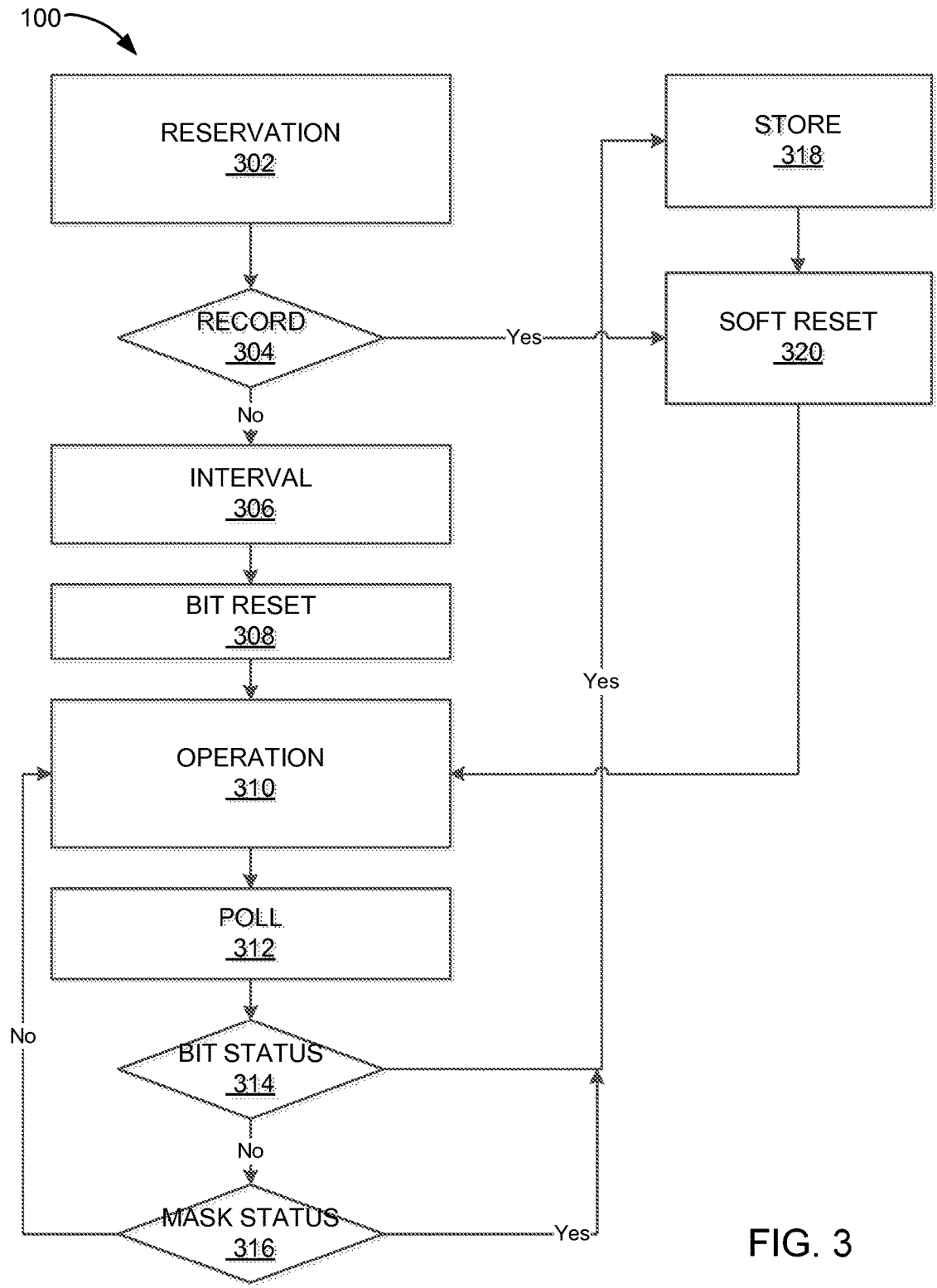
FIG. 3 is an example of a flow chart for the computing system executing the debug assert mechanism.

Referring now to FIG. 3, therein is shown an example of a flow chart for the computing system 100 executing the debug assert mechanism. At the power on reset, the computing system 100 can establish which instance of the bit 210 of FIG. 2 of the debug assert flag mask 206 of FIG. 2 corresponds to the core 202 of FIG. 2 at a module 302. More specifically as an example, the computing system 100 can establish the location of the debug assert flag mask 206 in the volatile memory 126 of FIG. 1.

As an example, the computing system 100 can reserve the address space (not shown) for the debug assert flag mask 206. In some embodiments, the address space can be for a range of address for the computing system 100 if the debug assert flag mask 206 is distributed among multiple instances of the volatile memory 126 of the computing system 100. In further embodiments, the address space can be reserved for one portion of the computing system 100, such memory address for the memory devices 117 of FIG. 1 representing the volatile memory or the nonvolatile memory.

As an example, the computing system 100 can reserve the address space (not shown) for the assert dump information 216 of FIG. 2. In some embodiments, the address space can be for the address range for the computing system 100 if the assert dump information 216 is distributed among multiple instances of the non-volatile region 128 of FIG. 1 of the computing system 100. In further embodiments, the address space can be for one portion of the computing system 100, such memory address for the non-volatile memory 112 of FIG. 1, the HDD 116 of FIG. 1, or a combination thereof.

At a module 304, the computing system 100 can determine whether the non-volatile region 128 stored the assert dump information 216 of FIG. 2 previously or not. If the computing system 100 determined that the assert dump information 216 was stored previously in the non-volatile region 128, the computing system 100 can put the debug information 208 of FIG. 2 back in the volatile memory 126, such as DDR DRAM at a module 318. The details of the module 318 will be discussed below.

If the assert dump information 216 was not previously stored, the computing system 100 can set the predefined interval 214 of FIG. 2 for the timer 212 of FIG. 2 at a module 306. The computing system 100 can set the predefined interval 214 to determine the time value between each polling of the debug assert flag mask 206 by the core 202. At a module 308, the computing system 100 can reset all instances of the bit 210 in the debug assert flag mask 206 to zero value.

At a module 310, the computing system 100 can operate the system. As discussed earlier, if the error 222 occurred at one of multiple instances of the core 202, each instances of the core 202 can access the volatile memory 126 through the arbiter 204 of FIG. 2 to set the corresponding instance of the bit 210 to non-zero value in the debug assert flag mask 206. Further, the core 202 can store the debug information 208 to the volatile memory 126 when the error 222 occurs. For example, the core 202 can store the debug information 208 in the volatile memory 126 different from where the debug assert flag mask 206 is stored. For another example, the core 202 can store the debug information 208 within the core 202 itself.

At a module 312, the core 202 can poll the debug assert flag mask 206 to see if the error 222 had occurred at one of the other multiple instances of the core 202. The timer 212 can indicate the core 202 to poll at the time period as indicated in the predefined interval 214 to see if the debug assert flag mask 206 includes the bit 210 with a non-zero value. At a module 314, if all instances of the bit 210 in the debug assert flag mask 206 are set to non-zero value or "Yes" in the flow chart, the computing system 100 can move on to the module 318 to store the debug information 208 in the volatile memory 126.

If the result is "No" from the module 314, the flow chart can move on to a module 316. At the module 316, in a situation where the debug assert flag mask 206 includes a non-zero value for a time period equal to or greater than the non-zero time limit 218 of FIG. 2, the computing system 100 can store the debug information 208 in the non-volatile region 128 in the block 318 even if all instances of the bit 210 within the debug assert flag mask 206 is not set to no-zero value. If the debug assert flag mask 206 includes the non-zero value for less than the non-zero time limit 218, the computing system 100 can return to the module 310.

At the module 318, the computing system 100 can store the debug information 208 from the core 202 to the volatile memory 126, the non-volatile region 128, or a combination thereof. Once the computing system 100 compile all instances of the debug information 208 from all instances of the core 202 based on the debug assert flag mask 206, the core 202, such as the interface core 224 of FIG. 2, can store the assert dump information 216 to the non-volatile region 128, such as the non-volatile memory 112, the HDD 116, the memory devices 117, or a combination thereof.

At a module 320, the computing system 100 can undergo soft reset after the assert dump information 216. More specifically as an example, the 100 can reset all instances of the bit 210 in the debug assert flag mask 206 and the core 202 for the soft reset.

Figure 4:
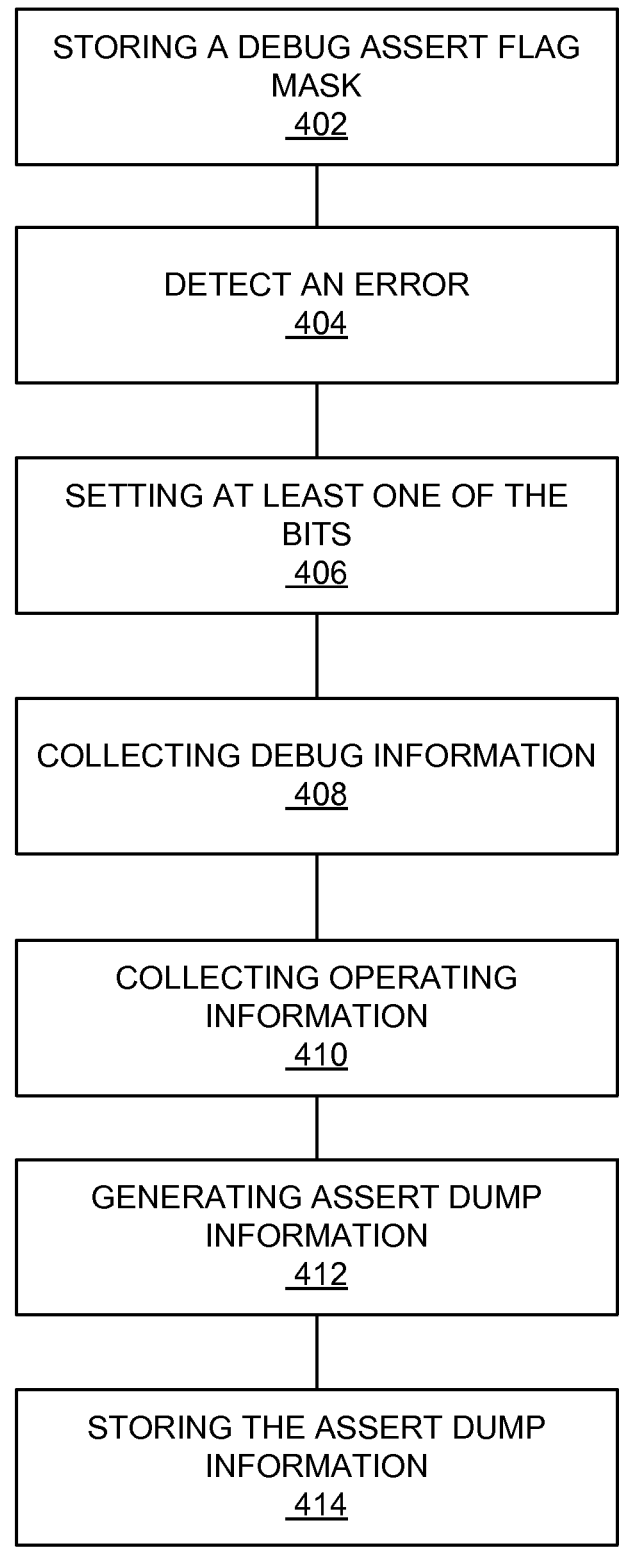
FIG. 4 is a flow chart of a method of operation of a computing system in an embodiment of the present invention.

Referring now to FIG. 4, therein is shown a flow chart of a method 400 of operation of a computing system 100 in an embodiment of the present invention. The method 400 includes: storing a debug assert flag mask including bits corresponding to the cores in a block 402; detecting an error in at least one of the cores in a block 404; setting at least one of the bits corresponding to the cores with the error detected in a block 406; collecting debug information for each of the cores with the error detected in a block 408; collecting operating information for each of the cores without the error detected in a block 410; generating assert dump information based on compiling the debug information in a block 412; and storing the assert dump information by at least one of the cores in a block 414.

The method 400 for block 410 can further include generating the assert dump information with an interface core based on the debug information from each of the cores for storing in the non-volatile memory. The block 410 can yet further include generating the assert dump information with a backup core based on the debug information from each of the cores for storing in the non-volatile memory if an interface core is unavailable.

It has been discovered that the present invention improves the robustness of the testing procedures for the computing system 100 by storing the debug information 208 of FIG. 2 when the error 222 of FIG. 2 occurs at the one of the multiple instances of the core 202 of FIG. 2. By setting the debug assert flag mask 206 of FIG. 2 for a corresponding instance of the bit 210 for each instances of the core 202 based on the debug information 208, the computing system 100 can track which instance out of many instances of the cores 202 detected the error 202. As a result, the core 202 can generate the assert dump information 206 based on compiling the debug information 208 from each instances of the core 202 for storing in the non-volatile memory 112 of FIG. 1 for further analysis of the error 222.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
   a volatile memory configured to:
      store a debug assert flag mask including bits;
   cores, coupled to the volatile memory, configured to:
      detect an error in at least one of the cores,
      set at least one of the bits corresponding to the cores when the error is detected,
      collect debug information for each of the cores with the error detected,
      generate assert dump information based on compiling the debug information; and
   a nonvolatile memory, coupled to at least one of the cores, configured to:
      store the assert dump information by at least one of the cores.

2. The system as claimed in claim 1 wherein the cores are configured to poll the debug assert flag mask at a predefined interval for checking the bits to determine whether the error has occurred.

3. The system as claimed in claim 1 wherein the cores includes an interface core configured to generate the assert dump information based on the debug information from each of the cores for storing in the non-volatile memory.

4. The system as claimed in claim 1 wherein the cores includes a backup core configured to generate the assert dump information based on the debug information from each of the cores for storing in the non-volatile memory if an interface core is unavailable.

5. The system as claimed in claim 1 wherein the cores are configured to generate the assert dump information based on the debug assert flag mask including a same instance of a non-zero value for at least a non-zero time limit.

6. The system as claimed in claim 1 wherein the cores are configured to set the bits within the debug assert flag mask from a zero value to non-zero value or vice versa if one of the cores detects the error.

7. The system as claimed in claim 1 wherein the cores are configured to retry storing the assert dump information including the operating information based on a retry threshold for storing in the non-volatile memory.

8. The system as claimed in claim 1 wherein the cores are configured to read the assert dump information based on the assert dump information existing at a power-on for storing the assert dump information back into the volatile memory.

9. The system as claimed in claim 1 further comprising a timer, coupled to the cores, configured to set a predefined interval for polling the debug assert flag mask by the cores.

10. The system as claimed in claim 1 further comprising an arbiter configured to grant access to the cores for storing the assert dump information into the non-volatile memory.

11. The system as claimed in claim 1 wherein the cores are configured to collect operating information for each of the cores without the error detected.

12. A method of operation of a computing system comprising:
   storing a debug assert flag mask including bits corresponding a plurality of cores;
   detecting an error in at least one of the cores;
   setting at least one of the bits corresponding to the cores with the error detected;
   collecting debug information for each of the cores with the error detected;
   generating assert dump information based on compiling the debug information; and
   storing the assert dump information by at least one of the cores.

13. The method as claimed in claim 12 further comprising polling the debug assert flag mask at a predefined interval for checking the bits to determine whether the error has occurred.

14. The method as claimed in claim 12 wherein generating the assert dump information includes generating the assert dump information with an interface core based on the debug information from each of the cores for storing in a non-volatile memory.

15. The method as claimed in claim 12 wherein generating the assert dump information includes generating the assert dump information with a backup core based on the debug information from each of the cores for storing in a non-volatile memory if an interface core is unavailable.

16. The method as claimed in claim 12 wherein generating the assert dump information includes generating the assert dump information based on the debug assert flag mask including a same instance of a non-zero value for at least a non-zero time limit.

17. The method as claimed in claim 12 further comprising setting the bits within the debug assert flag mask from a zero value to non-zero value or vice versa if one of the cores detects the error.

18. The method as claimed in claim 12 further comprising retrying to store the assert dump information including the operating information based on a retry threshold for storing in a non-volatile memory.

19. The method as claimed in claim 12 further comprising reading the assert dump information based on the assert dump information existing at a power-on for storing the assert dump information back into a volatile memory.

20. The method as claimed in claim 12 further comprising setting a predefined interval for polling the debug assert flag mask by the cores.

21. The method as claimed in claim 12 further comprising granting access to the cores for storing the assert dump information into a non-volatile memory.

22. The method as claimed in claim 12 further comprising collecting operating information for each of the cores without the error detected.

* * * * *